Patented Nov. 20, 1934

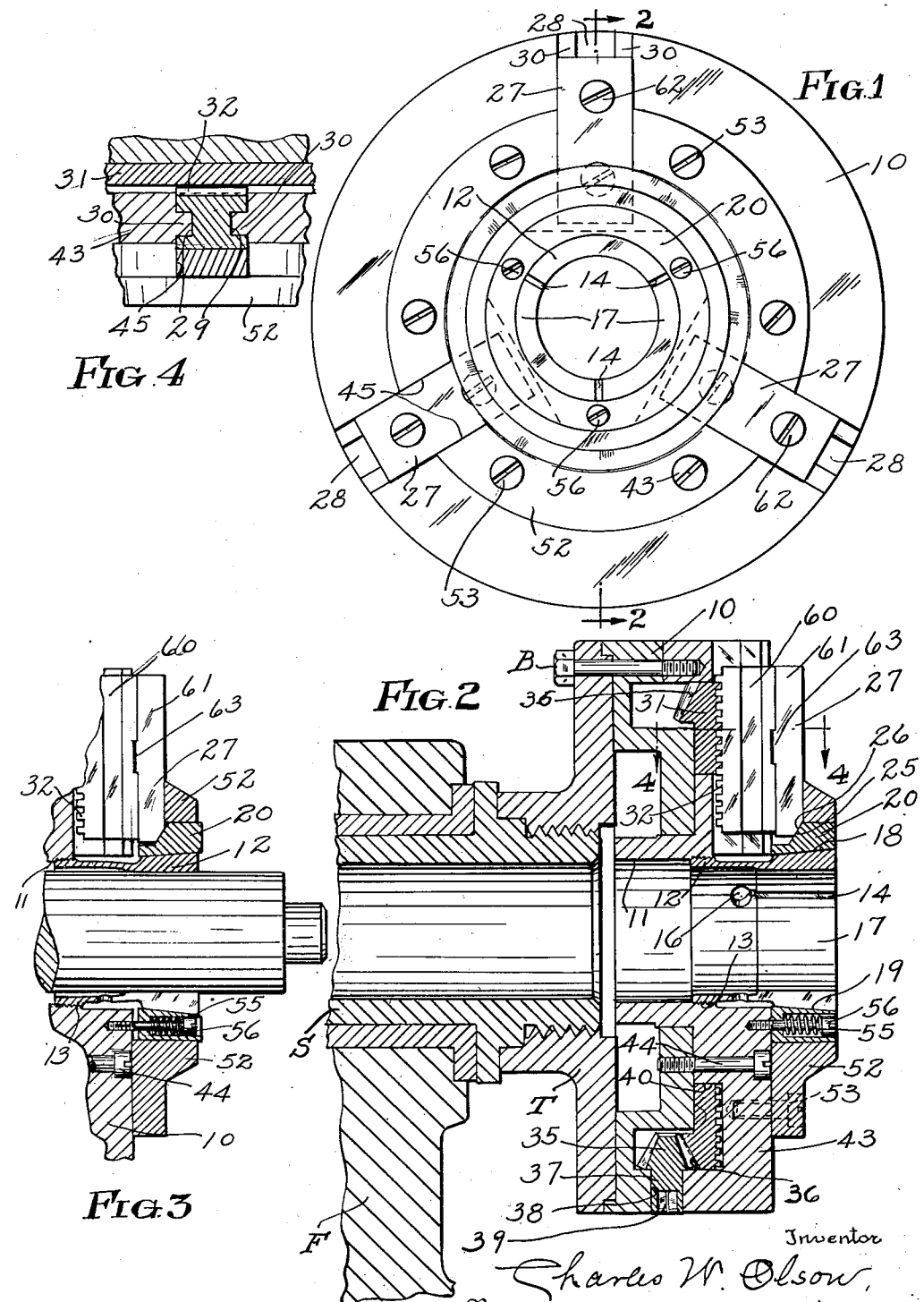

1,981,660

UNITED STATES PATENT OFFICE 1,981,660

COLLET CHUCK

Charles W. Olson, Cleveland Heights, Ohio

Application March 15, 1933, Serial No. 660,827

1 Claim. (Cl. 279—46)

This invention relates to a chucking device for a machine tool, and especially to a chuck or workholder for use in connection with an engine lathe or similar type of metal-cutting machine, wherein the chuck is used to grip and rotate either the work or the tool. The present invention is more particularly concerned with an improved form of collet type of chuck.

The general object of the present invention is to provide a collet chuck which will quickly grip cylindrical parts, such as rods and the like, and hold them concentric with the axis of the lathe or machine spindle on which the chuck is mounted, retaining the work in such concentric alignment with a greater degree of precision than possible with the usual collets.

A more specific object is to provide a chucking device of the collet type, in which the collet jaws may be operated by a machinist in the same manner as the jaws of the ordinary universal type chuck with which all machinists are familiar, and to so arrange the chuck that it may readily be adapted for various diameters of work, or readily used as a standard universal jaw chuck.

Other objects of the invention will become apparent from the following description, which refers to a preferred embodiment of the invention illustrated in the accompanying drawing. The essential and novel features of the invention will be set forth in the claim.

In the drawing, Fig. 1 is a front elevation of my improved chuck; Fig. 2 is a vertical axial section, as indicated by the lines 2—2 on Fig. 1; Fig. 3 is a fragmentary sectional view, taken in the same plane as Fig. 2, but illustrating certain of the parts in different positions; Fig. 4 is a fragmentary transverse section as indicated by the lines 4—4 on Fig. 2.

Referring again to the drawing, and especially to Fig. 2, I have indicated at F a frame or relatively stationary member of an engine lathe, having a spindle S which is rotated in the usual manner. Mounted on a projecting end of the spindle, by means of a suitable threaded connection, is a face plate T to which the chuck is secured in the customary manner by bolts B.

My improved chuck comprises, as shown, a chuck body 10, which is provided with an axial opening 11, into which one end of a collet member 12 is inserted and retained in place by a suitable threaded connection 13. The collet 12 is of the split sleeve type, having three slots 14 extending through the walls of the collet from the outer edge 15 thereof, to a point 16 adjacent the rear edge. This arrangement is such that tongues 17 formed by the slots 14 provide jaws between which the work is clamped when the collet is contracted.

As shown in Figs. 2 and 3, the outer periphery of each collet jaw is bevelled outwardly as at 18 and is arranged to be engaged by a complementarily tapered surface 19 of a ring 20, which embraces the collet, the arrangement being such that as the ring 20 is pushed outwardly from the face of the chuck body, it will cause the collet jaws to be contracted to grip a cylindrical body, as shown in Fig. 3.

In the past, collet chucks have been, for the most part, either the draw-in or push-out type, that is, the collet member has been arranged to grip the work consequent upon the pushing out or drawing in of the collet itself, along the chuck axis. In the present invention, however, the body of the collet 17 threadingly engages the chuck body, and thereby axial movement of the collet itself is prevented. To cause the collet to grip the work, the collet contracting ring 20 is moved axially relative to the collet. This enables the work to be quickly gripped, accurately centered and readily held in a definite longitudinal position with an extremely high degree of precision. It will be apparent that this is a decided advantage in a chucking device of this type.

To move the collet clamping ring 20, I provide it with a series of bevelled surfaces 25, each of which is arranged to be engaged by a tapered nose 26 of respective cam members 27, which are radially slidable in suitable ways 28 in the chuck body 10. The cam members are so arranged that an inward movement of such cams—that is, a movement toward the axis of the spindle—will cause the collet contracting ring 20 to be forced outwardly from the chuck face, with the result that the bevelled surfaces 25 and 26, of the clamping ring and collet, respectively, will coact to cause the collet to grip the work.

The cam members 27 are grooved on opposite sides, as shown at 29 in Fig. 4, to fit tongues 30 in the radial guideways 28, and suitable mechanism is provided for simultaneously and equally operating the respective cam members to operate the clamping ring, which controls the collet.

As a convenient and compact means for operating the cam members 27, I have shown them as moved by a scroll plate 31 which has a spiral rib engaging teeth 32 on the back of the jaws 60, carrying the members 27. It results that whenever the scroll is rotated all of the cam members are simultaneously moved inwardly and outwardly.

The scroll 31 may be in the nature of a circular disc, mounted in a recess 40 formed in the chuck body, and retained therein by a clamping plate member 43, which engages a portion of the rearmost face of the scroll plate and is secured to the chuck body by suitable bolts 44.

The rotation of the scroll plate 31 may be effected in any suitable manner. For this purpose, I have shown a bevelled pinion 35, rotatably mounted in the chuck body and meshing with a bevel gear 36 on the back of the scroll. The bevelled pinion 35 is shown as provided with a hub 37, which extends through an opening 38 in the chuck body and is arranged so that it may be turned from the outer periphery of the chuck by a suitable wrench (not shown) which is arranged to engage a socket 39 formed in the end of the pinion hub.

When the scroll plate is rotated in one direction it serves to move the cam members 27 radially inward, causing the tapered surface 26 thereof to act on the collet clamping ring 20 so as to force it outwardly relative to the face of the chuck. The clamping ring has a cylindrical exterior making a sliding fit in a cylindrical opening in a relatively rigid bearing plate member 52, which is secured to the face of the chuck body 10 by suitable bolts 53. The bearing plate not only forms a bearing for the collet clamping ring, but also forms a guide for the cam members 27. As shown, the bearing plate is slotted radially as at 45 and arranged so that the side walls of the slots embrace the sides of the cam members, which extend outwardly beyond the face of the chuck body. This provides a very rigid construction, and aids materially in guiding and aligning of the cam members 27, as well as the collet contracting ring 20.

When it is desired to release the work, the bevelled gear 35 is rotated in an opposite direction, which rotates the scroll plate 31 in a direction to cause the cam members 27 to move outward radially. As the cam members move outwardly suitable springs 55, which embrace stud bolts 56 carried by the chuck body 10, serve to force the collet-clamping ring 20 inwardly toward the chuck face, to release the collet jaws, which then spring back to their original or expanded position.

It will be noted that the collet member 17 in my improved chucking mechanism may readily be replaced, so that different collets may be successively installed, suitable for work of different diameters. To replace a collet, it is rotated to disengage it from the threads 12 of the chuck body, after which a different collet may then readily be inserted. The arrangement is such that the collet may be removed without removing the ring 20, the collet threads being of such a diameter that they may readily pass through the opening in the ring.

The chuck is so arranged that it may readily be converted into a standard universal chuck for the accommodation of comparatively large diameters of work. To this end, each of the cam members 27 is made in two parts 60 and 61. The inner part 60 is engaged by the tongues 30 of the chuck body while the outer part 61 is secured to it by suitable bolts 62 and a tongue and groove connection 63. Hence, when it is desired to convert the chuck to a radial jaw chuck, the collet 17, the collet contracting ring 20, and the bearing plate 52 and the portions 61 of the cam members are removed, the latter being replaced by the usual stepped chuck jaw members. Likewise, a standard chuck may readily be fitted with my improvements and converted into a collet chuck of great accuracy.

From the foregoing description, it is apparent that I have provided a chucking device of the collet type with which a high degree of accuracy may be obtained, and I have so arranged my improved chuck that it may be readily converted into the usual three-jaw universal chuck, and I have further so simplified the construction that present day existing chucks may be remodeled with little more work than the mere addition of parts.

I claim:

In a chuck, the combination of a chuck body, a collet in axial alignment with and secured to said body and provided with a plurality of jaws extending outwardly from said body, said collet jaws having their outer surfaces bevelled, a ring provided with a corresponding internal bevel arranged to coact with the bevelled surfaces of the collet jaws whereby an axial movement of the ring will cause a contraction of the jaws, said ring being provided with a plurality of tapered surfaces, a plurality of members movable radially relative to the chuck body and arranged to engage said tapered surfaces to cause said ring to be moved axially, each of said members being provided with teeth, a scroll plate rotatably mounted in the chuck body and threadingly engaging said teeth and means to rotate the scroll whereby the collet may be expanded and contracted as desired.

CHARLES W. OLSON.